United States Patent
Maeda

(10) Patent No.: US 9,946,270 B2
(45) Date of Patent: Apr. 17, 2018

(54) FLOW RATE CONTROL VALVE ASSEMBLY

(71) Applicant: Fronto Co.,Ltd., Tokyo (JP)

(72) Inventor: Masato Maeda, Tokyo (JP)

(73) Assignee: FRONTO CO., LTD., Tokyo (JP)

( * ) Notice: Subject to any disclaimer, the term of this patent is extended or adjusted under 35 U.S.C. 154(b) by 384 days.

(21) Appl. No.: 14/871,032

(22) Filed: Sep. 30, 2015

(65) Prior Publication Data

US 2016/0098043 A1   Apr. 7, 2016

(30) Foreign Application Priority Data

Oct. 1, 2014   (JP) .................................. 2014-203063

(51) Int. Cl.
   *G05D 7/06*   (2006.01)
   *G05B 19/416*   (2006.01)
   *F16K 47/06*   (2006.01)

(52) U.S. Cl.
   CPC ........... *G05D 7/0635* (2013.01); *F16K 47/06* (2013.01); *G05B 19/416* (2013.01); *G05B 2219/41303* (2013.01); *G05B 2219/49056* (2013.01)

(58) Field of Classification Search
   CPC ........ G05D 7/0635; G05B 2219/49056; G05B 2219/41303
   See application file for complete search history.

(56) References Cited

FOREIGN PATENT DOCUMENTS

| JP | 2006-138399 A | 6/2006 |
|----|---------------|--------|
| JP | 2009-162384 A | 7/2009 |

OTHER PUBLICATIONS

Bruus, "Theoretical microfluidics", DTU, Lecture notes, Second Edition, Fall 2005, pp. 1-195 (205 pages total).
Kobayashi et al., "New Edition: The Theory of Movement", Asakura Publishing Co., Ltd., 22nd print, Oct. 1997, pp. 28-30; pp. 48-51.

*Primary Examiner* — Douglas Menz
(74) *Attorney, Agent, or Firm* — Birch, Stewart, Kolasch & Birch, LLP

(57) ABSTRACT

An object of the invention is to provide a flow rate control valve assembly capable of preventing a flow rate from varying in a direction opposite to the desired direction upon flow rate control As shown in FIG. 1, the flow rate control valve assembly comprises a sliding shaft and a sliding cylindrical surface which fit slidably in with each other in an axial direction, and a moving mechanism for moving the sliding shaft in an axial direction.

At least one of the sliding surface of the sliding shaft and the sliding cylindrical surface is provided with one or a plurality of tapered grooves having its specific area defining a fluid passage. The tapered groove is configured such that flow passage resistance increases or decreases gradually along a lengthwise direction, and a cavity formed at an end of the sliding shaft for making sure of a sliding area is formed at a site isolated or shut off from the fluid passage.

10 Claims, 7 Drawing Sheets

FLOW RATE CONTROL VALVE ASSEMBLY

TECHNICAL ART

The present invention relates generally to a control valve assembly adapted to control the flow rates of fluids such as liquids and gases, and more particularly to a flow rate control valve assembly that is capable of gaining precise control of a wide range of flow rates and has reliability high enough to stand up to long-term use.

BACKGROUND ART

Problems with a conventional needle valve are that it has a narrow flow rate control range, and as it is repeatedly used, it changes gradually, flow rate control gets unstable or the flow rate cannot be reduced down to zero. With this in mind, the inventor has proposed a flow rate control valve that does not undergo any flow rate change even when there are temperature changes so that a flow rate change relative to the angle of rotation remains constant irrespective of position, as disclosed in JP(A) 2006-138399 (Patent Publication 1).

To provide a solution to a problem that as fine foreign matters enter a flow passage through the flow rate control valve described in Patent Publication 1, it causes the flow rate to get noticeably low in a discontinuous manner, the inventor has later put forward a flow rate control valve having a plurality of grooves, as described in JP(A) 2009-162384. FIG. 7 is a longitudinal section of the construction and arrangement of this flow rate control valve. The flow rate control valve comprises a valve body 110, a sleeve 120, a sliding shaft 130, a moving mechanism 140, a knob 150, O-rings 161 to 165, etc.

The knob 150 is operated for control of a flow rate through the flow rate control valve, and fixed to an operating shaft 142 of the moving mechanism 140. The moving mechanism 140 comprises an operating shaft 142 to rotate the shaft by the knob 150 for axial movement of the sliding shaft 130, and a coupling 141 for coupling the operating shaft 142 to the sliding shaft 130 such that the rotation of the operating shaft 142 is not transmitted to it. The operating shaft 142 is in threaded engagement with a threaded portion 110a of the valve body 110 via a threaded portion 143.

The coupling 141 comprises a box nut 141a, a machine screw 141c, a long nut 141d, etc. for coupling of the operating shaft 142 to the sliding shaft 130 having a tapered groove such that the rotation of the operating shaft 142 is not transmitted to the sliding shaft 130. The operating shaft 142 and box nut 141a are fixed to each other as by bonding of threaded portions, so that they cannot rotate relative to each other.

The machine screw 141c has its head held within the box nut 141a, and bonded to the box nut 141a with its leg in threaded engagement with the long nut 141d by way of a through-hole in the box nut 141a. Further, the long nut 141d is press fitted and fixed by an adhesive in a threaded bore in the sliding shaft 130. A washer formed of ethylene fluoride resin having a low friction resistance is interposed between the head of the machine screw 141c and the box nut 141a, and between the box nut 141a and the long nut 141d so that the rotational motion of the box nut 141a in association with the rotation of the operating shaft 142 is less likely to be transmitted to the machine screw 141c.

The sliding shaft 130 is constructed from a guide 131, a sliding portion 132 and a tapered groove 133. The guide 131 is connected to the machine screw 141c by way of a threaded bore through the long nut 141d located thereon, and provided with two O-ring grooves on its outer periphery so that the outer periphery is axially movable along the inside surface of the valve body 110.

O-rings 161 and 162 for sealing the sliding shaft are attached to the two O-ring grooves, and a shutoff O-ring 163 is mounted on a stepped portion at the middle. The sliding portion 132 is provided with the tapered groove 133 comprising a plurality of parallel grooves for formation of a fluid passage, said grooves having their depths decreasing or increasing gradually along the lengthwise direction.

The sleeve 120 is configured in such a way as to be open at one (top) end of a cylindrical configuration and closed at the other (bottom) end. The sleeve 120 is attached to the inside of the valve body 110 from a direction in opposition to the sliding shaft 130, viz., from below, and a sliding cylindrical surface 121a formed on the inner periphery of a cylindrical sleeve portion 121 is fitted over the sliding shaft 130 such that they are slidable relative to each other in an axial direction.

An outer diameter portion of the sleeve 120 in a longitudinally central position is provided with an O-ring groove, and an O-ring 165 is provided within this O-ring groove to enable the inner peripheral surface of the valve body 110 to have sealing action thereby preventing a fluid leakage from an inlet side to an outlet side. Below the sleeve 120 there is a sleeve cavity 123 formed to take hold of an area where the sliding shaft 130 is slidable. At a lower end of the cavity 123, a shutoff tapered hole 124a and a radially extending sleeve outlet bore 124b in communication with the hole 124a are provided so as to guide a fluid flowing through a fluid passage formed by the tapered groove 33 to an outlet 114 of the body 110.

The fluid passage formed by the tapered groove 133, used herein, is understood to refer to a portion of an opening surface of the tapered groove 133 that is covered and closed by a portion of the overall length of the tapered groove 133 where the sliding cylindrical surface 121a on the upper end side of the sleeve 120 fits in with the sliding portion 132 of the sliding shaft 130.

Between the outer peripheral surface of the sleeve cylindrical portion 121 and the inner peripheral surface of the valve body 110, there is a flow passage space 113 formed so as to guide a fluid flowing from a fluid inlet 111 of the valve body 110 into an inlet 112 to the aforesaid fluid passage formed by the tapered groove 133.

The fluid entering the valve body 110 from the fluid inlet 111 passes from the inlet 112 through the flow passage space 113 between the outer peripheral surface of the sleeve cylindrical portion and the inner peripheral surface of the valve body 110, then through the fluid passage formed by the tapered groove 133 comprising three grooves, then through the tapered hole 124a and sleeve outlet bore 124b, and then goes out of the fluid outlet 114. And as the knob 150 turns or reverses, it causes the sliding shaft 130 to reciprocate axially relative to the valve body 110 with the result that the sectional area of the opening in the tapered groove 133, viz., the groove in the upper end of the sleeve 120 varies for flow rate control.

This flow rate control valve is capable of precise control over a wide range from very minute flow rates to relatively high flow rates. With increasing frequency in use, however, there has been a phenomenon known to an operator, in which activation of the sliding shaft for flow rate control causes a flow rate to change in a direction opposite to the direction of a temporarily predetermined flow rate change. Reverse movement such as a backlash may often give rise to a grave problem: it may disturb the operator although temporal or throw off the blending precision of the fluid to be prepared. While the aforesaid flow rate control valve has a feature of being capable of precise control of very minute flow rates, it is to be noted that the aforesaid flow rate variations have some considerable or adverse influences on such a minute flow rate control.

Automatic control is generally designed such that a flow rate comes close to the desired one by rapid activation of a flow rate control valve. For such behaviors, however, it is required to gain stepwise or incremental control of flow rate changes: it is necessary for the operator to wait until the flow rate is changed a bit to find one position where the flow rate remains stable, and again change the flow rate to find another position where the flow rate remains stable. Alternatively, it may be possible to extend the operation time long enough to have no adverse influence. In either case, some considerable time is taken for flow rate control.

PRIOR PUBLICATIONS

Patent Publications

Patent Publication 1: JP(A) 2006-138399
Patent Publication 2: JP(A) 2009-162384

Non-Patent Publications

Non-Patent Publication 1: Kiyoshi Kobayashi and Yoshihiro Iida, "New Edition: The Theory of Movement", $22^{nd}$ print, Asakura Publishing Co., Ltd. October 1997, p. 30, p. 48
Non-Patent Publication 2: Technical University of Denmark, MIC: Department of Micro and Nanotechnology, Dr. Henric Bruus, Theoretical L microfluidics, Lecture notes second edition, fall 2005

SUMMARY OF THE INVENTION

Object of the Invention

An object of the invention is to provide a flow rate control valve assembly capable of preventing flow rate variations in a direction in opposition to the direction intended for flow rate control.

HOW TO ACCOMPLISH THE OBJECT

The inventor has made intensive analyses and studies on the behaviors of flow rate control valves and the incidental phenomena to accomplish the aforesaid object. As a result, the inventor has found that the aforesaid problem is caused by variations in the space volume of the sliding area for the operating shaft in association with activation of the operating shaft. More specifically, the inventor has found that the aforesaid problem is caused by influences on the fluid to be controlled in terms of flow rate of a pressure resulting from variations in the space volume of the sleeve cavity 123 due to the piston motion of the sliding shaft 130.

This behavior is more often found in liquid than in gas. Gas such as nitrogen gas has a viscosity resistance or viscous drag of about 1/50 as compared with that of water that is a liquid; so it is less likely to be affected by the piston motion. As operation for reducing the flow rate is implemented when the fluid is a liquid, it causes the internal pressure of the cavity to change by the piston motion depending on the operating speed. In turn, this causes the liquid within the cavity to be forced out so that the flow rate keeps on growing high until the internal pressure of the cavity gets stabilized. For instance, when the overall size of the sliding shaft is 8 mm, the area S of the shaft end may be found from:

$$S=0.4^2\pi=0.5024 \text{ cm}^2$$

Upon movement of the sliding shaft at a speed of 1 cm/min., the flow rate Q to be forced out becomes 0.5 cm³/min. An ordinary flow rate control valve using a tapered groove is capable of flow rate control of the order of 0.1 ml/min; when the valve is operated within such a range, the flow rate to be forced out can have noticeable influences.

When a flow rate control valve using a prior art tapered groove is used with gas (nitrogen gas) and liquid (water) as fluids, respectively, relations between the position of rotation of the operating shaft (the amount of movement of a resistance shaft), viz., the preset flow rate and actual flow rate changes are indicated in FIGS. 5 and 6 wherein a reference alphabet a affixed to a two-dotted chain line graph stands for the number of rotations of the operating shaft (the amount of movement of the resistance shaft), a reference alphabet b affixed to a solid line graph stands for the flow rate of an actually flowing fluid, a1 stands for a flow-rate increasing operation, a2 stands for a flow-rate decreasing operation, and a broken line stands for an ideal behavior. Note here that these graphs are representative of only clear changes by simplifying a part of the graphs indicative of actual results of measurement for the sake of an easy understanding.

It is found from FIGS. 5 and 6 that as the preset flow rate (the amount of movement of the resistance shaft) changes in order of a→a'→a, the flow rate, too, changes correspondingly in order of b→b'→b; however, the flow rate changes temporarily in a direction opposite to the control direction. The liquid undergoes larger variations than the gas does.

According to the invention, it has now been understood that such flow rate variations as described above may be prevented by completely shutting a play margin space of such an operating shaft off from fluid flow passages or forming these flow passages and cavity at structurally isolated locations. That is, the aforesaid problems can be solved by the invention embodied as follows.

(1) A flow rate control valve assembly, comprising a sliding shaft and a sliding cylindrical surface which fit slidably in with each other in an axial direction, and a moving mechanism for moving said sliding shaft in an axial direction, wherein:
at least one sliding surface of said sliding shaft and said sliding cylindrical surface is provided with one or a plurality of tapered grooves having its specific area defining a fluid passage, said tapered groove being configured such that flow passage resistance increases or decreases gradually along a lengthwise direction, and
a cavity formed at an end of said sliding shaft for making sure of a sliding area is formed at a site isolated or shut off from said fluid passage.
(2) A flow rate control valve assembly as recited in (1), wherein an inlet or outlet of said fluid passage is formed on a portion of said sliding cylindrical surface.
(3) A flow rate control valve assembly as recited in (1) or (2), wherein said tapered groove is provided at its end with a flow passage extension over a movable range of said sliding shaft, said flow passage extension defining a space area having a flow passage resistance smaller than the minimum flow passage resistance of said tapered groove, and said end is connected to said inlet or said outlet.

(4) A flow rate control valve assembly as recited in (3), wherein said flow passage extension is defined by a portion of said sliding shaft having a smaller diameter.
(5) A flow rate control valve assembly as recited in any one of (1) to (4), wherein said tapered groove is formed in such a way as to have a flow rate resistance decreasing or increasing gradually according to an exponential function derived from Hagen-Poiseuille equation.
(6) A flow rate control valve assembly as recited in any one of (1) to (4), wherein said tapered groove is formed in such a way as to have a sectional area decreasing or increasing gradually according to a linear characteristic feature wherein the sectional area increases in direct proportion to a moving distance or according to a parabolic characteristic feature wherein the sectional area increases in direct proportion to the square of a moving distance.
(7) A flow rate control valve assembly as recited in any one of (1) to (5), wherein said tapered groove is spirally formed.
(8) A flow rate control valve assembly as recited in any one of (1) to (7), wherein said moving mechanism is constructed of a driving mechanism capable of controllable linear movement.
(9) A flow rate control valve assembly as recited in any one of (1) to (7), wherein said sliding shaft and said moving mechanism are partly covered with bellows.
(10) A flow rate control valve assembly as recited in any one of (1) to (7), wherein a driving shaft of said moving mechanism and said sliding cylindrical surface are constructed of materials having mutually different coefficients of thermal expansion, and said tapered groove is configured such that an amount of change in the flow rate caused by a change in the interval of said fluid passage defined by said tapered groove upon expansion or contraction of said materials due to temperature changes is canceled out by an amount of change in the flow rate caused by a change in viscosity resistance of fluid due to temperature changes or, alternatively, said tapered groove is constructed and arranged such that temperature signals and pressure signals are captured in a computer that controls a driving system to make a correction for deviation from a target figure for the flow rate.

Advantages of the Invention

According to the invention, there can be a flow rate control valve assembly provided that is capable of preventing flow rate variations in a direction opposite to an intended direction upon flow rate control and of precise flow rate control, and can eliminate adverse influences on minute flow rates in particular and function without difficulty even in an automatic control mode.

MODES FOR CARRYING OUT THE INVENTION

Figure 1:
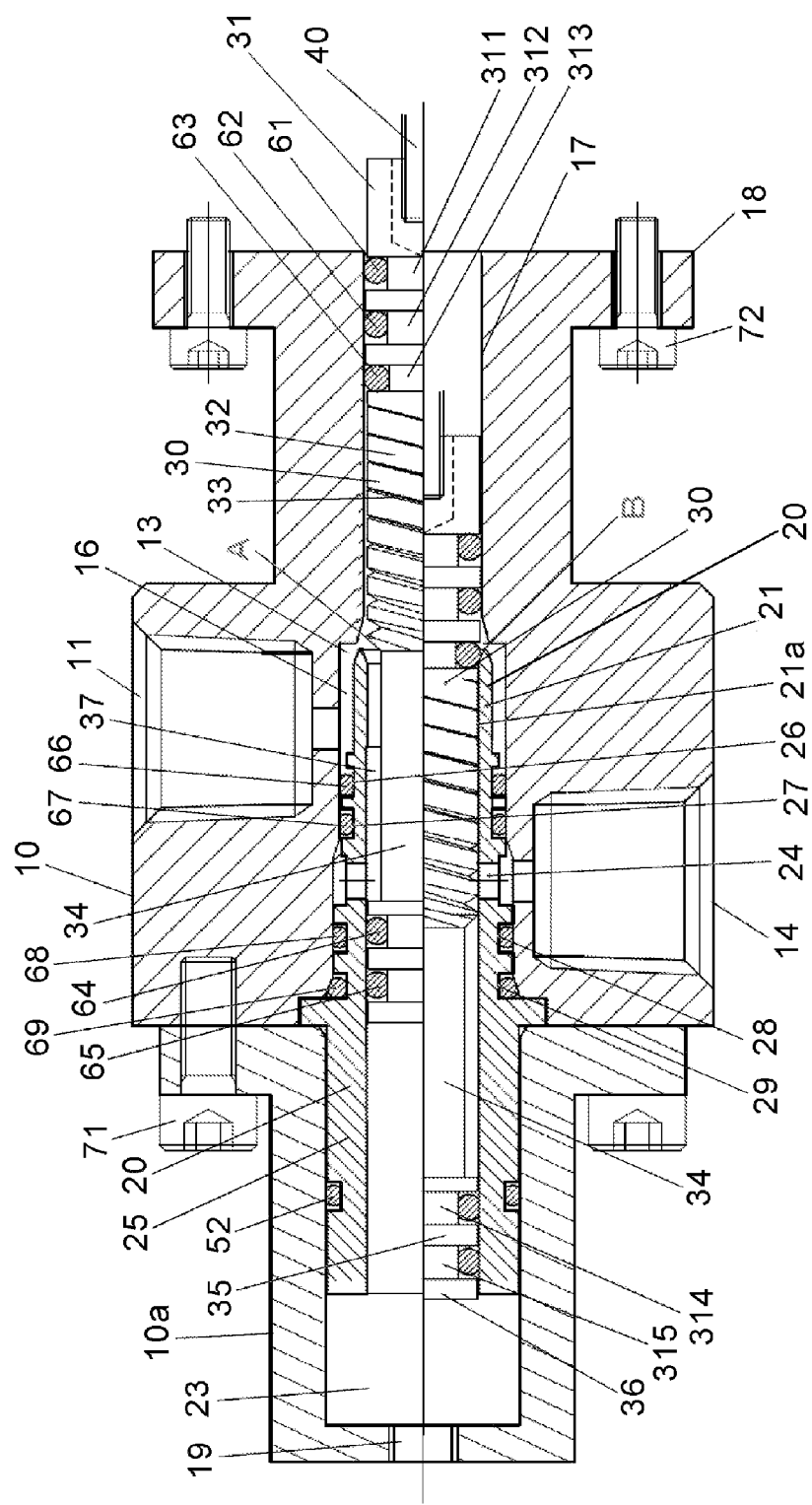
FIG. 1 is a sectional view of one basic construction and arrangement of the flow rate control valve assembly (Example 1) according to the invention.

The present invention provides a flow rate control valve assembly, comprising a sliding shaft and a sliding cylindrical surface which fit slidably in with each other in an axial direction, and a moving mechanism for moving said sliding shaft in an axial direction, wherein at least one sliding surface of said sliding shaft and said sliding cylindrical surface is provided with one or more tapered grooves having its specific area defining a fluid passage, said tapered groove being configured such that flow passage resistance increases or decreases gradually along a lengthwise direction, and a cavity formed at an end of said sliding shaft for making sure of a sliding area is formed at a location other than said fluid passage.

Thus, the cavity formed at an end of said sliding shaft for making sure of a sliding area is formed at a location other than said fluid passage so that pressure changes within the cavity resulting from the piston motion of the sliding shaft can be shut off from the fluid passage.

There is no particular limitation on how to form the cavity at a site other than the aforesaid fluid passage. For instance, an extension may be provided from an end of a groove-formation portion of the sliding shaft to an end of the sliding shaft to make the distance between the end of the groove-formation portion and the end of the sliding shaft long, and a flow passage to an inlet or an outlet may be formed at the extension site. And the fluid resistance may be kept constant everywhere during sliding movement. It follows that there may be none of the fluid inlet and outlet present within the sliding area at the end of the sliding shaft affected by piston motion.

There is no particular limitation on the configuration of the flow passage formed at the aforesaid extension site. In other words, the flow passage may be constructed and arranged such that it has no adverse influence on the flow and flow rate of a fluid restricted by the tapered groove, and that there is no change in the fluid resistance during sliding movement of the sliding shaft. To be specific, it is preferable to make the diameter of the sliding shaft small enough to provide a cylindrical space area defined by a space of a donut-like shape in section between the sliding shaft and the sliding surface. Alternatively, a cylindrical space and a long bore form of opening may be provided within the sliding shaft to connect the tapered groove to the inlet or outlet. Yet, alternatively, the sliding shaft may be provided on its surface with one or more grooves for extension.

In the invention, the flow rate of a fluid is controlled by the tapered groove to enable a wide range of precise flow rate control. Further, if the sliding shaft and sliding cylindrical surface are formed of an appropriate material and the configuration of the tapered groove is adjustable, it is then possible to reduce errors due to temperature changes down to a minimum level.

In the flow rate control valve assembly of the invention, the sectional size of the flow passage formed by the groove decreases (or increases) gradually. A groove of a regular triangle shape or the like in section is provided in a linear, spiral or other form on the outer peripheral surface of the cylindrical sliding shaft or the sliding cylindrical surface that is defined by the inner peripheral surface of a bore, and inserted through the sliding cylindrical surface that is an inner cylinder coming in close contact with the aforesaid outer peripheral surface. The groove is then formed such that its depth increases or decreases gradually so that some area of one of the sliding shaft and sliding cylindrical surface comes in close contact with, and fits in with, some area of the other, creating a flow passage in a cylindrical form where only portions of the groove in such specific areas are closed. And movement of the sliding shaft causes the specific areas to move and the fluid resistance through the groove to change so that the flow rate can be controlled.

This groove may be formed as desired but with high precision depending on the necessary rate of change in fluid resistance. What is here needed is only to form the groove, and this processing is relatively easy as well. Because the length and size of the groove is settable as desired, it is possible to set the variable range and rate of change as desired over a wide range. In turn, it is possible to gain high precision flow rate control with a simple structure yet over a wide range. By way of example but not by way of limitation, one tapered groove may be provided, or two or more may be provided; for prevention of degradation or deterioration, however, three or more tapered grooves are preferable. Note here that too many grooves give rise to some detriments: increased production costs, difficulty in size reductions, and poor precision. In a normal form of use, at most five or six tapered grooves are preferably provided.

The basic construction and arrangement of the invention is now explained with reference to the accompanying drawings. FIG. 1 is a longitudinal section of the basic construction and arrangement of the flow rate control valve assembly according to the invention. In FIG. 1, an upper half A with respect to the center line is illustrative of a full open state and a lower half B of a full closed state. This flow rate control valve assembly comprises a valve body 10, a sleeve 20, a sliding shaft 30, etc. A fluid enters the valve body 10 through a fluid inlet 11, and leaves the valve body 10 from a fluid outlet 14. The sliding shaft 30 having a tapered groove formed in it (hereinafter called the sliding shaft) is partly covered by a sliding cylindrical surface 21a that is an inner surface of the sleeve 20 located within the valve body 10, and the rest is exposed to view.

An outer peripheral sliding surface of a sliding portion 32 that is a site of the sliding shaft 30 where a groove is formed comes in close contact with, and fits in with, the sliding cylindrical surface 21a of the sleeve 20; the fluid entering through the fluid inlet 11 passes through a fluid passage space 13 that is an outer peripheral space of the sleeve 20, then through a tapered groove 33 in the sliding shaft 30, and then goes out of the fluid outlet 14. As the sliding shaft 30 is axially activated by way of an operating shaft 43, it causes a change in the sectional size of the tapered groove 33 that opens at the end of the sleeve, resulting in a change in the flow passage resistance. This in turn makes it possible to change the flow rate. Note here that the tapered groove increases gradually in the outflow direction; so the sectional size of the tapered groove 33 that opens at the end of the sleeve governs the overall fluid resistance.

Figure 2:
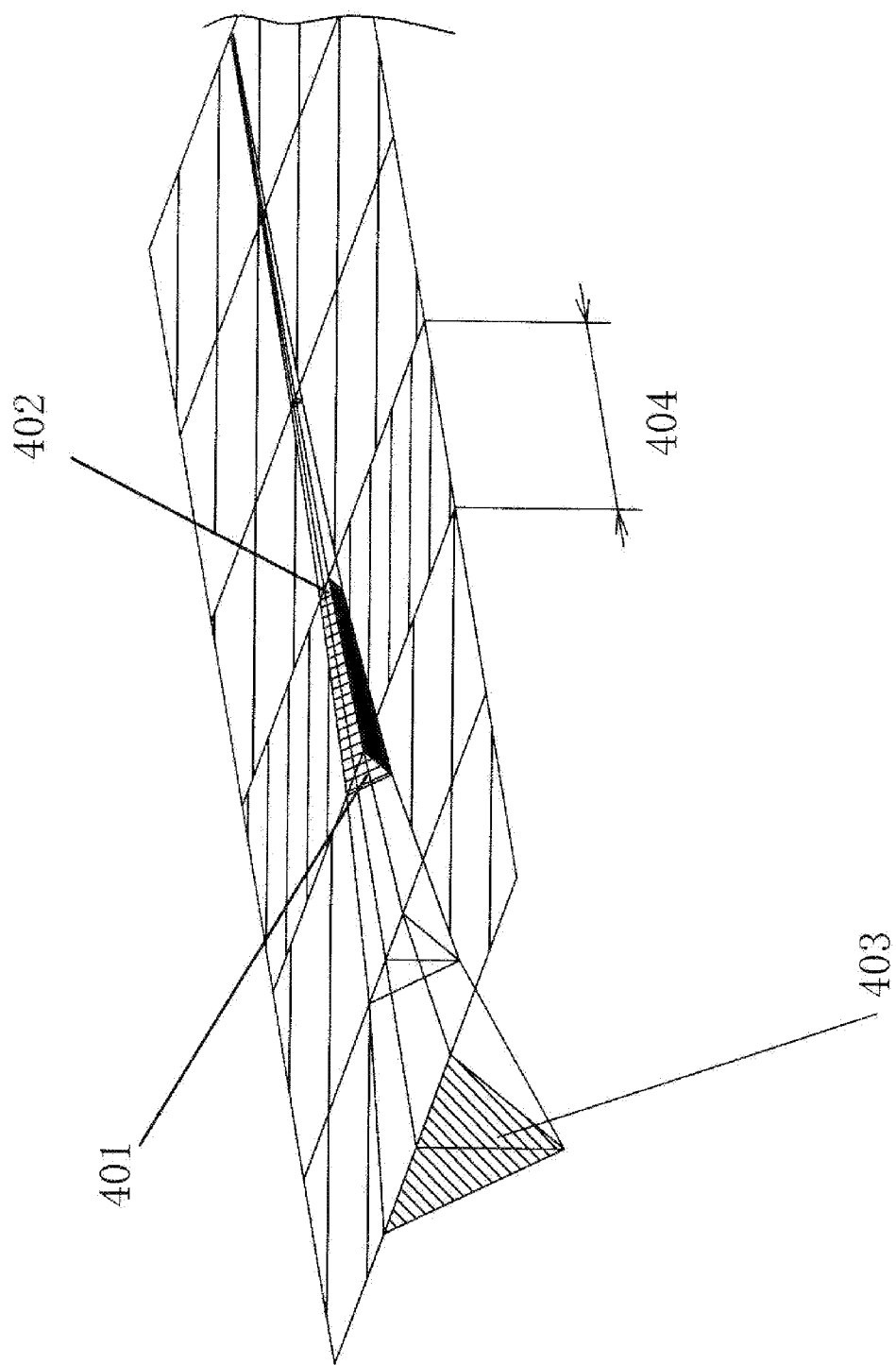
FIG. 2 is schematically illustrative of an exemplary configuration of a groove having a triangle shape in section in a flow rate control assembly having a tapered group.

FIG. 2 is a stereographical view of a flow passage having a triangle shape in section and having a groove depth undergoing a geometric series change. With reference to a groove 333 of FIG. 1, a regular triangle groove 403 having a depth undergoing a geometric series change, as shown in FIG. 2, is assembled in a cylindrical surface shape. A fluid enters the regular triangle groove through a fluid inlet 402, and leaves the groove out of a fluid outlet 401. As the sliding shaft 330 of FIG. 1 moves axially, an interval 404 moves and the flow passage resistance changes.

How to determine the configuration of the tapered groove is explained typically with reference to an example using Hagen-Poiseuille's law. Hagen-Poiseuille's law teaches that the flow rate of a laminar flow through a circular pipe usually increases proportionally to the fourth power of its diameter. For a noncircular flow passage, too, it is known that the flow rate is proportional to the fourth power of the "hydrodynamic equivalent diameter" depending on its flow passage configuration (see Non-Patent Publication 1). Consequently, as the depth of the triangle groove becomes $1/10$, the flow rate gets low down to $10^{-4}$ or $1/10,000$. By forming on the outer periphery of the shaft a triangle groove whose depth decreases exponentially, it is possible to reduce the flow rate exponentially.

For instance, consider here a flow rate through an interval having a groove depth of 1.5 mm on average and a flow rate through an interval having a groove depth of $1/10$ or 0.15 mm on average. As the depth becomes $1/10$, the flow rate is down to $1/10,000$. In other words, under a condition that the flow rate is 1 L/mm in an interval having a groove depth of 1.5 mm on average, the flow rate is 0.1 mL/mm in an interval of 0.15 mm. To be precise, integral calculation must be performed with respect to the pipe passage resistance of the triangle flow passage for an interval having an exponential function.

How to determine fluid resistance using Hagen-Poiseuille's law is here explained at greater length. Hagen-Poiseuille's equation is described in general textbooks, etc. on fluid mechanics and engineering, and for its details, see them. Suppose here that a fluid having a coefficient of viscosity $\mu$ flows at a differential pressure $\Delta p$ through a circular pipe having a radius r and a length L. The laminar flow rate Q is then represented by the following Hagen-Poiseuille's equation (1), and the resistance R of the flow passage is given by the following equation (2).

$$Q = R\Delta p \quad (1)$$

$$R = 8 \ \mu L / \pi r^4 \quad (2)$$

Consider now a flow passage in a regular triangle form having one side length a. The flow rate in the triangle flow passage is described for a flow passage of a triangle shape in section shown in FIG. 2.6(c) in Section 2.4.4 of Non-Patent Publication 2 (Technical University of Denmark, MIC: Department of Micro and Nanotechnology, Dr. Henric Bruus, Theoretical L microfluids, Lecture notes second edition, fall 2005). As the flow passage resistance R is found from Equation 2.37 for finding the flow rate Q shown in this section according to the foregoing, the following equation (3) is derived.

$$R = \frac{320 \ \mu L}{\sqrt{3} \ a^4} \quad (3)$$

Assume now that the height of the regular triangle is h.

$$h = \frac{\sqrt{3}}{2}a \quad (4)$$

Then, the resistance of the regular triangle flow passage having a height h is reduced from Equations (3) and (4) to the following equation.

$$R = \frac{180\,\mu L}{\sqrt{3}\,h^4} \quad (5)$$

Next, the flow passage resistance having a depth decreasing in the longitudinal direction is found.

Referring here to a regular triangle flow passage having a depth decreasing exponentially in the longitudinal direction, the depth of the groove is represented by the following equation where L=x.

$$h(x)=\alpha e^{-\beta \cdot x} \quad (6)$$

From Equations (5) and (6), the resistance through a certain minute interval in the longitudinal direction may be expressed as below.

$$\frac{dR}{dx} = \frac{180\,\mu(1+4\beta x)}{\sqrt{3}\,\alpha^4} e^{4\beta \cdot x} \quad (7)$$

If this is integrated, the resistance through an interval from x-L to x in the longitudinal direction is then given by $$R = \int \frac{dR}{dx} = \int_{x-L}^{x} \frac{180\,\mu(1+4\beta x)}{\sqrt{3}\,\alpha^4} e^{4\beta \cdot x}$$
$$= \frac{180\,\mu}{\sqrt{3}\,\alpha^4} \{x e^{4\beta x} - (x-L)e^{4\beta(x-L)}\} \quad (8)$$

This Equation (8) is a calculation formula for finding the fluid resistance of a fluid having a coefficient of viscosity μ as that fluid passes through a flow passage having a depth decreasing gradually in the longitudinal direction, a regular triangle shape in section and a full length L. From this formula, it is possible to calculate relations between the flow passage length L or the coefficient of viscosity μ of the fluid and the fluid resistance·flow rate.

Thus, when the tapered groove has a sectional shape pursuant to Hagen-Poiseuille's law, its sectional shape may be found according to the aforesaid formula; however, the shape of the groove may be determined on the basis of data, etc. obtained by verification of a model having an actual groove. Alternatively, the shape of the groove may be determined in such a way as to have the following two characteristic features commonly used as valve characteristic features.

(1) Linear Flow Rate Feature

A valve is designed such that as it opens, the sectional area increases in direct proportion to a moving distance provided that the sectional area is zero at a shutoff position. The depth (height) of the groove is now taken as a function of a moving distance x from a shutoff position in an opening direction. To achieve this feature, the depth of the groove may be determined in such a way as to be root proportional to the moving distance x. This results in:

$$h=A\sqrt{x} \text{ where } A \text{ is a proportional constant} \quad (9)$$

When the groove of a regular triangle shape has a depth h in the aforesaid formula (9), the sectional area S of that portion of the groove is S=($\sqrt{3}$/2)h² or it is proportional to the square of the depth h. Therefore, as the depth h of the groove is made proportional to $\sqrt{x}$ for the distance x in the lengthwise direction, the sectional area is the square of $\sqrt{x}$ for x or it is in direct proportion to x. A rectangular groove with h as depth and b as width may be expressed as b=kh where k is a coefficient; so the sectional area of that portion of the groove may be expressed as S=kh². In this case, too, the sectional area S is proportional to the square of the depth h.

(2) Parabolic Flow Rate Feature

A valve is designed such that as it opens, the sectional area increases in direct proportion to the square of a moving distance provided that the sectional area is zero at a shutoff position. The depth h of the groove is now taken as a function of the moving distance x from a shutoff position in an opening direction. To achieve this feature, the depth h of the groove may be determined in such a way as to be proportional to the moving distance x. This results in:

$$h=A\cdot x \text{ where } A \text{ is a proportional constant} \quad (10)$$

In Equation (10), too, as the depth h of the groove is determined in such a way as to be in direct proportion to the distance x in the lengthwise direction as is the case with the aforesaid Equation (9), the sectional area will be proportional to the square of x.

By the way, a valve capacity "Cv" value is generally used to stand for the flow rate of a fluid through a valve. For instance, Hagen-Poiseuille's equation holds for a laminar fluid flow; however, there is a turbulent state prevailing through an orifice used as an element for throttling a fluid or in an area where a flow rate increases beyond a Reynolds number of 2,000. It is impossible to obtain a precise Cv value unless very complicated factors such as fluid's specific gravity and viscosity, valve's primary pressure and second pressure, valve temperatures, valve shape, and configurations of pipes are taken into account, and software dedicated to calculation of Cv values or the like are usually employed. Simple calculation formulae known for Cv include empirical ones described on makers' catalogues, typically, $$Cv=0.0525 \text{ where } S \text{ is a sectional area.}$$

This formula may be used to obtain an estimated value.

In the invention, while it is desired to determine the sectional area of the groove on the basis of Hagen-Poiseuille's law, it is to be understood that the sectional area may be determined according to the aforesaid linear or parabolic flow rate characteristic feature. Specifically, the sectional area and shape of the groove may be selectively optimized depending on the performance of the flow rate control valve in need, the specifications of the valve in need, environments wherein valves are used, the type of the fluid used, etc.

The sectional shape of the tapered groove is not limited to the aforesaid example; so any desired shape may be selected. The sectional area may have any desired tetragonal, triangular, semicircular or like other shape provided that fluid resistance increases or decreases gradually according to each of the aforesaid formulae and law. However, if ease of processing or ease of work for calculating fluid resistance is taken into consideration, preference is given to semicircular sectional shape or triangular shapes, among which the regular triangle sectional shape is most preferred. The tapered groove may be extended in the longitudinal direction, viz. from one end of a flow passage to the other end in any desired configurations including a linear, spiral, zigzag or sinuous configuration. Mainly from the standpoints of cost and prevention of clogging, preference is given to the linear configuration. When it is desired to take a wide control range, the curved or sinuous configuration such as spiral configuration is preferable. The spiral configuration is recommendable because of ease of processing. Alternatively, the sliding shaft and sliding cylindrical surface may be provided with an external screw and an internal screw and a portion of them, for instance, a portion of the thread of the external screw may be removed so that the groove is formed by the trough of the internal screw. Yet, alternatively, a spiral groove and a linear groove may typically be combined together into a combined type groove to make the flow rate control range wider.

In the invention, the lengths of the sliding shaft and sliding cylindrical surface are determined such that an area defined by a portion of the tapered groove provides a flow passage. To be more specific, as the sliding shaft slides relative to the sliding cylindrical surface, it causes a change in the area of portions of the sliding shaft and sliding cylindrical surface coming into close contact with each other. In turn, only a portion of the tapered groove lying in such a specific area creates a flow passage. And as the groove portion lying in this specific area changes, it also causes a fluid resistance change for flow rate control. In other words, a specific fluid resistance corresponds to a specific position of the groove: if the position of the groove forming the flow passage changes, the fluid resistance changes too.

Referring to the area where the sliding shaft closely contact and fit in with the sliding cylindrical surface, one may be shorter than the other such that one closely contacts and fits in with only a portion of the other. Alternatively, as shown in FIG. 1, there may be a structure used wherein one state in which the ends of both members closely contact and fit in with each other in a nesting manner passes gradually into another state where both members generally closely contact and fit in with each other. The "close contact/fit" used herein is understood to refer to a state wherein the outer peripheral surface of the cylindrical sliding shaft comes into close, snug contact with the sliding cylindrical surface defined by the inner peripheral surface of the cylindrical housing, rendering it impossible for any fluid to be present except the inside of the tapered groove. Therefore, the portion of the overall groove to determine fluid resistance is a portion corresponding to an open end where the sliding shaft passes from the area wherein it closely contacts and fits in with the sliding cylindrical surface to the area where it does not, said portion having a higher fluid resistance or a smaller section. The sizes and lengths of the sliding shaft and sliding cylindrical surface may be selectively optimized depending on the performance and specifications of the groove or flow rate control valve to be formed, environments in which it is used, the type of fluids, etc.

There is no particular limitation on materials of which the sliding shaft and sliding cylindrical surface are formed; use may be made of materials commonly employed for flow rate control valves. The material used may be optimized depending on the performance and specifications of the flow rate valve in need, environments in which it is used, the type of fluids, etc. From the standpoints of chemical resistance, ease of processing, temperature characteristics, etc., preference is given to resin materials, for instance, ethylene fluoride resins, nylon resins and polyacetal resins, among which nylon 66, polyacetal resin, ethylene tetrafluoride resin and ethylene trifluoride resin are most preferable. The material of which the valve body or operating shaft is formed includes, but is not limited to, metals such as brass, stainless steel, surface treated iron, and various alloys having corrosion resistance.

Through the determination of material and groove structure, the flow rate control valve of the invention may make an active temperature correction. The viscosity of a gas increases with an increasing temperature, and the flow rate resistance of the gas grows high as well. Correspondingly, there is a decrease in the flow rate of the gas flowing through the flow rate control valve as the temperature rises. If the length of a flow passage is made shorter upon temperature rises to reduce the flow rate resistance of the gas, on the other hand, it is then possible to increase the flow rate of the gas.

The viscosity of a liquid decreases with an increasing temperature, and the flow rate resistance of the liquid grows low as well. Correspondingly, there is an increase in the flow rate of the liquid flowing through the flow rate control valve as the temperature rises. If the length of a flow passage is made longer upon temperature rises to increase the flow rate resistance of the liquid, on the other hand, it is then possible to decrease the flow rate of the liquid.

Thus, the viscosities of the gas and liquid have opposite properties relative to temperature changes; however, if reverse correction activation is optionally implemented, it is then possible to achieve a flow rate control valve that undergoes no flow rate change even upon temperature changes.

That is, the groove may be configured such that the amount of a flow rate change caused by a change in the interval (position) through the fluid passage due to temperature changes is canceled out by the amount of a flow rate change caused by a change in the viscosity resistance or drag of fluid. If there is a change in the interval (position) that becomes a resistance element even while the length of the fluid passage of the groove remains constant, it is then possible to change the flow rate resistance because the depth of the groove changes. The resulting effect can clear the flow rate of temperature dependency.

To be specific, when the sectional shape of the tapered groove is a regular triangle having a depth dwindling (creeping up) exponentially along the longitudinal direction, the driving or operating shaft of the moving mechanism for movement of the sliding shaft is constructed from a metal material or the like and the sleeve or valve body having a sliding cylindrical surface is constructed of a resin material, leading to a difference in the coefficient of thermal expansion between both. For instance, there is a difference of $7 \times 10^{-5}/°$ C. in the coefficient of thermal expansion between brass and nylon resin. The coefficient of dynamic viscosity $\mu$ of air increases by a factor of 1.73 as the temperature rises from 0° C. to 100° C. It is found from the aforesaid formula that when the coefficient of dynamic viscosity increases by a factor of 1.73, then the flow rate goes down to 1/1.73. As the temperature rises from 0° C. to 100° C., on the other hand, there is an amount of relative displacement between the operating shaft and the housing at the fluid passage portion. Then, the fluid passage defined by the tapered groove moves relatively, resulting in a decrease in fluid resistance through the flow passage. Thus, the groove having such a configuration as canceling out the increment of the coefficient of dynamic viscosity may be constructed and arranged for temperature compensation.

While the temperature compensation for flow rates makes use of a displacement difference between the housing and the operating shaft of the moving mechanism due to their respective thermal expansion in the longitudinal direction, it is to be noted that the portion coming into contact with the outer surface of the sliding cylindrical surface having the tapered groove, viz., the sliding shaft and the portion of the sliding cylindrical surface having the tapered groove, viz., the housing are preferably constructed of a material having the same coefficient of thermal expansion. Alternatively, when the valve body is formed of different materials, there may be an auxiliary sleeve provided. In any case, it is possible to prevent the gap between both from getting wide in the diametrical direction, resulting in a large change in the flow rate or from getting too narrow in the diametrical direction, resulting in deactivation of the operating shaft.

The temperature compensation here may also be implemented by automatic control instead of the method making use of a difference in the coefficient of thermal expansion of materials. To be specific, signals of fluid temperature from a thermometer may be captured and operated in a CPU for controlling a driving system for the operating shaft so that a flow rate change due to temperature is corrected. Alternatively, electrical signals of readings about not only temperature but also primary and secondary pressures may be captured in the CPU for correction operation such that the target flow rate is kept invariable with respect to temperature and pressure.

As an example of the invention applied to when the coefficient of viscosity of a fluid is unknown, reference is now made to how to determine a dial position at a specific flow rate by one-point calibration.

For a fluid having an unknown coefficient of viscosity or a mixture of two or more fluids such as a mixed gas, it is often desired to avoid cumbersome calculation of the coefficient of viscosity. Under a certain pressure condition, a flow rate in a certain rotation position of a dial is then measured, and the thus measured flow rate is guided to that dial position and subjected to "one-point calibration" for determination of the rotation position of the dial.

Even when one or both of the pressure condition and viscosity are unknown and if there is a fluid rate known in a certain position defined by the number of dial rotations, that flow rate is in proportional relation to flow rates in other valve's dial positions, which are equivocally determined unless there are changes in the differential pressure and the coefficient of viscosity of a fluid. This "one-point calibration" method ensures that even when there is only a flow meter having a narrow range in hand, even a flow rate departing from a measuring range given to that flow meter can be set within an error of the "same order" as the flow meter used.

Even when the coefficient of viscosity changes due to temperature and pressure, the aforesaid "one-point" calibration" method enables the flow rate of every fluid to be set over a wide range provided that it is a viscous flow. Through precision expected depending on the precision of a flow rate subjected to one-point calibration, it is possible to set flow rates over a wide range.

When it is desired to set a wide range of flow rates precisely, a flow rate is measured in the vicinity of a full scale where a mass flow meter works more precisely to determine a dial position. It is therefore possible to set even a very small flow rate in the dial position that could not be measured in a mass flow state unless there are large pressure/temperature changes.

More specific embodiments of the invention are now explained in further details with reference to the accompanying drawings.

Example 1

FIG. 1 shows a longitudinal section of Example 1 of the flow rate control valve assembly according to one embodiment of the invention. This flow rate control valve assembly comprises a valve body 10, a sleeve 20, a sliding shaft 30, a moving mechanism coupling 40, O-rings 61 to 65, and so on.

Figure 7:
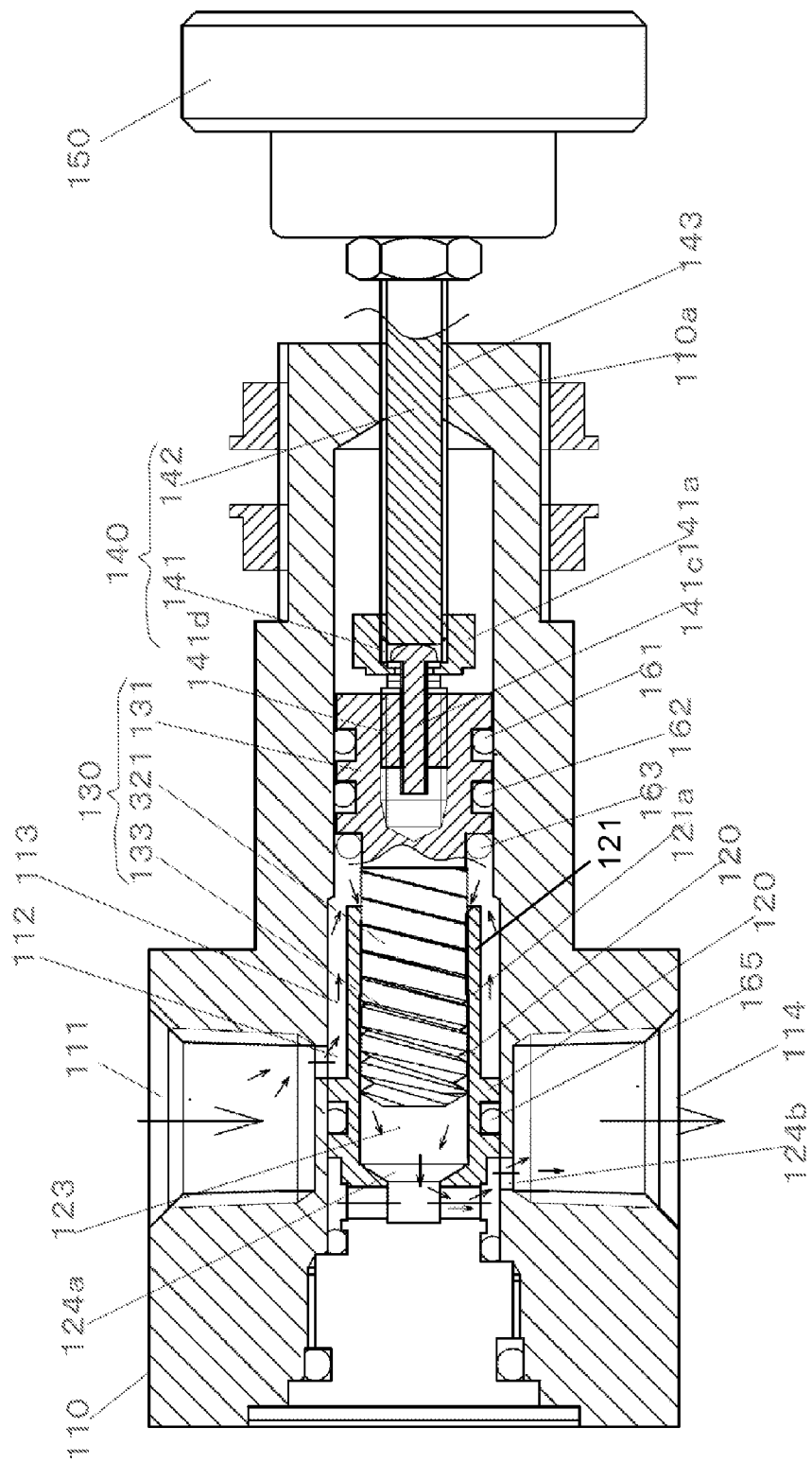
FIG. 7 is a sectional view of an exemplary construction and arrangement of a conventional flow rate control valve.

The moving mechanism coupling 40 is coupled with a moving mechanism for moving the sliding shaft 30 in an axial direction, and fixed to a structure or the like corresponding to an operating shaft 142 of the moving mechanism 140 as shown typically in FIG. 7. There is no particular limitation on the moving mechanism (not shown), and it may have various constructions and arrangements; for instance, it is constructed of an operating shaft that is rotated by an operating knob to move the sliding shaft 30 in the axial direction, and a coupling for coupling the operating shaft to the sliding shaft 30 such that the rotation of the operating shaft is not transmitted to the sliding shaft 30. The operating shaft is in threaded engagement with a threaded portion of the valve body by way of its threaded portion. For details of the moving mechanism by manual operation, see the explanation of FIG. 7.

The sliding shaft 30 comprises a guide 31, a sliding portion 32, a tapered groove 33, a flow passage extension 34, and a shaft end sealing portion 35. The guide 31 is connected to the moving mechanism (not shown) via the moving mechanism coupling 40 formed at the shaft end. The outer peripheral portion of the guide 31 on the moving mechanism coupling 40 side is provided with three O-ring grooves 311, 312, 313 so that the outer peripheral portion except the groove are axially movable along an sliding cylindrical inner side surface formed within the valve body 10.

O-rings 61, 62, 63 for sealing the sliding shaft are attached to the aforesaid three O-ring grooves 311, 312, 313 to form a first sealing portion. The O-ring 63 located just near the sliding portion 32 comes in contact with the end of the sleeve 20 upon closure of the valve, producing a shutoff function. The sliding portion 32 is provided with the tapered groove 33 that forms a fluid passage through its outer peripheral portion. In this embodiment, the tapered groove 30 comprises a plurality of parallel, spiral grooves, each having a depth decreasing or increasing gradually in the lengthwise direction.

The sliding shaft 30 is provided at its end with the shaft end sealing portion 35. O-ring grooves 314, 315 are formed at this shaft end sealing portion 35, and there are O-rings 64, 65 for sealing the sliding shaft mounted within them. A fluid is almost completely shut off by the shaft end sealing portion 35 so that it does not flow from the shaft end 36 into a cavity 23.

An extending flow passage 37 is formed by the flow passage extension 34 between the sliding portion 32 and the shaft end sealing portion 35. This extending flow passage 37 has a function of guiding a fluid leaving the sliding portion 32 through the tapered groove 33 to the outlet 14, and is formed in such a way as to hold a constant sectional area, viz., a constant fluid resistance within the range of sliding movement of the sliding shaft 30. In this embodiment, the flow passage extension 34 has a diameter smaller than the outer diameter of the sliding shaft 30 in general, and the sliding portion 32 in particular, and the extending flow passage 37 is defined by a space that is a gap between it and the sliding cylindrical surface 21a, forming a cylindrical space of donut shape in section over the range of sliding movement of the sliding shaft 30. And an opening in the tapered groove 30 on the maximum sectional area side is open in the extending flow passage 37 so that the fluid flows from the tapered groove 33 into the extending flow passage.

A simple construction wherein the flow passage extension 34 has a diameter smaller than the outer diameter of the sliding portion 32 ensures that the sectional area of the space defined by the extending flow passage 37 that provides a flow passage over the range of sliding movement of the sliding shaft can be easily kept constant. In addition, the end of the tapered groove 33 can be easily connected to the outlet 14 over the range of sliding movement. The sectional area or fluid resistance of the extending flow passage 37 is set in such a way as to have no influence on the function of the flow rate control valve. To be specific, the sectional area is preferably set lager than the maximum sectional area of the tapered groove, and more preferably about 10 to 50 times as large as the maximum sectional area of the tapered groove, although there is no particular limitation on the upper limit. The space defined by the extending flow passage is mechanically shut off or isolated from the space defined by the cavity.

The sleeve 20 is open at both ends, and has an inner periphery surface in a smooth cylindrical form. The opening on the operating shaft side has a leading end tapered on both its outer periphery and its inner periphery so that a fluid through a flow passage space 13 that is a space on the outer periphery of the sleeve 20 can flow smoothly into the tapered groove. There is a cylindrical cavity formed within the valve body 10, in which cavity the sleeve 20 is inserted from the shaft end direction and attached to a sleeve-receiving portion 16 having a larger diameter. A shaft end cover 10a is detachably attached and fixed to the shaft end side of the valve body 10 by means of a setscrew 71, and removal of the shaft end cover 10a causes the sleeve-receiving portion 16 to be exposed for allowing for easy attachment/detachment of the sleeve 20.

The rear portion 25 of the sleeve is formed to make sure of the range of sliding movement of the sliding shaft 30 extended by the flow passage extension 34. After attachment of the sleeve 20 to the valve body 10, the rear portion 25 of the sleeve is received in the sleeve 20 by mounting the shaft end cover 10a on it. The internal space of the rear portion 25 of the sleeve and the shaft end cover 10a undergoes a volumetric change in association with activation of the shaft end 35 of the sliding shaft 30. In this example, gases in the internal space of the rear portion 25 of the sleeve and the shaft end cover 10a are sucked or exhausted via a vent 19 formed in the end shaft cover 10a in association with piston motion; however, it may be closed off for the reason of safety, etc. Since this space is completely shut off from the fluid passage by means of the O-rings 64, 65 attached to the O-ring grooves 314, 315 for sealing the sliding shaft, the aforesaid piston motion is unlikely to have influences on the fluid through the flow passage.

The sleeve 20 is provided in the longitudinally central outer peripheral portion with O-ring grooves 26, 27, and there are O-rings 66, 67 located in these O-rings to give a seal between it and the inner peripheral surface of the sleeve-receiving portion 16, thereby preventing the fluid from leaking from the inlet side out to the outlet side. A sleeve outlet hole 24 is formed on the shaft end side of the O-ring grooves 26, 27 in the radial direction so that the fluid coming out of the fluid passage defined by the tapered groove 33 can be guided to the outlet 14 of the valve body 10 by way of the aforesaid extending flow passage 37.

The sliding cylindrical surface 21a formed on the inner periphery of the sleeve sliding portion 21 closely contacts and fits in with the sliding portion 32 of the sliding shaft 30 such that they are slidable relative to each other in the axial direction. This allows the tapered groove 33 in close contact with the sliding cylindrical surface 21a to be covered up at its upper opening portion, providing a closed tubular fluid passage. Note here that the fluid flow passage defined by the tapered groove 33 refers to a portion where the opening surface in the tapered groove 33 is covered up and sealed by a portion of the full length of the tapered groove 33 wherein the sliding cylindrical surface 21a on the leading end of the sleeve 20 fits in with the sliding portion 32 of the sliding shaft 30.

Reference is then made to the operation of the flow rate control valve. The fluid entering the valve body 10 through the fluid inlet 11 passes through the flow passage space 13 between the outer peripheral surface of the sleeve cylindrical portion 21 and the inner peripheral surface of the valve body 10, then enters the fluid passage formed by the tapered groove 33 defined by three grooves from the end of the sleeve cylindrical portion 21, then passes through a flow passage portion defined by the tapered groove 33, and then goes out of the fluid outlet 14 by way of the extending flow passage 34. As by turning the knob for operating the operating shaft normally or reversely, the sliding shaft 30 is axially reciprocated relative to the valve body 10, thereby changing the magnitude of the groove opening at the sleeve end of the tapered groove 33 for the purpose of flow rate control.

Figure 4:
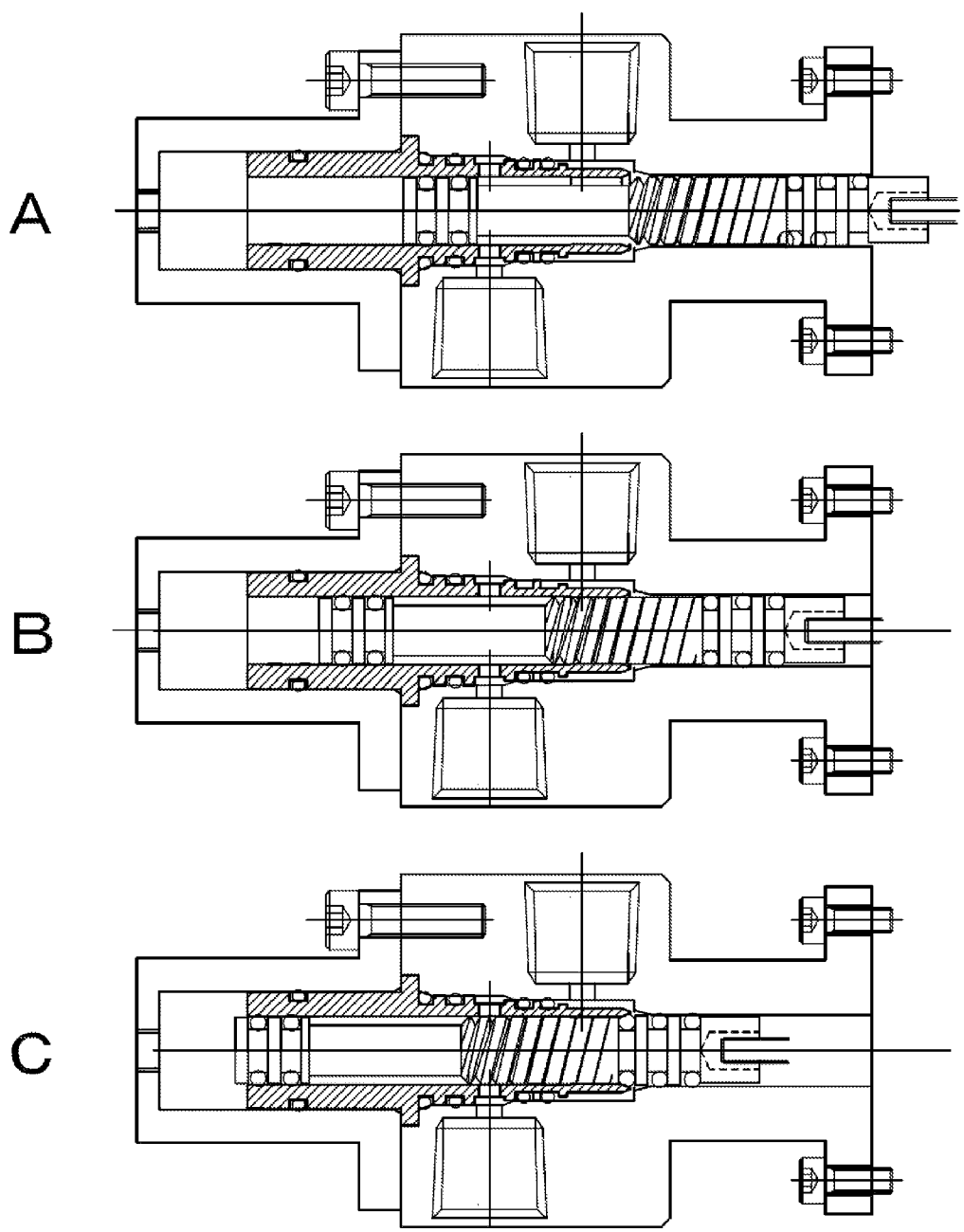
FIG. 4 is a sectional view of the flow rate control valve assembly having different opening states.

For instance, upon rotation of the operating shaft (not shown) as by a knob, the sliding shaft 30 moves together with the operating shaft in the axial direction so that the outer surface of the sliding portion 30 having the tapered groove 33 slides along the sliding cylindrical surface 21a of the sleeve 20. In that case, even when the operating shaft rotates, the sliding shaft 30 moves in the axial direction alone without rotating following that rotation. FIG. 4 is illustrative of the flow rate control valve during activation. In FIG. 4, A illustrates that the flow rate control valve is opened 100%, B that it is opened 50%, and C that it is in 100% closure.

Thus, as the sliding shaft is activated in the axial direction alone without rotation, it causes the friction distance between the outer periphery of the sliding shaft 30 and the sliding cylindrical surface of the sleeve's cylindrical portion 21 to get short considerably because there is only advancement/retraction movement prevailing. For instance, the friction distance is largely reduced from $\pi \cdot d = 3.14 \times 8 \approx 25$ mm for a diameter of 8 mm per rotation down to a pitch of thread=0.8 mm or about $\frac{1}{31}$. By this wearing is drastically reduced.

For the flow rate control valve, by the way, it is desired that the flow rate remains zero in a valve shutoff state. To this end it is preferable to provide the sliding shaft with a shutoff sealing member. In this example, the sliding shaft 30 has the O-ring 63 attached to its O-ring groove 313, as shown in FIG. 1. In the valve shutoff state, they function as a shutoff seal in the valve shutoff state where they come in close contact with the end of the sleeve 20 for closing off the end.

Referring to the fluid passage formed by the tapered groove 33 in the flow rate control valve shown in FIG. 1, the triangular groove increases gradually in size from the fluid inlet toward the fluid outlet, making sure of a structure in which the flow passage is less likely to be clogged up by foreign matters if any. While three grooves are used in the aforesaid example for the purpose of illustration only, it is to be noted that they may be provided in any desired number.

A flange 18 formed on the operating shaft side of the valve body 10 is designed such that a sealing structure or the like including bellows for fully sealing a mechanism for the operating shaft and a fluid relative to the operating side is mounted on it by means of a mounting screw 72. Note here that while the O-rings are provided in a pair form, a single one O-ring may be used because even when either one of them is left out, there is a sufficient sealing function obtainable.

Figure 5:
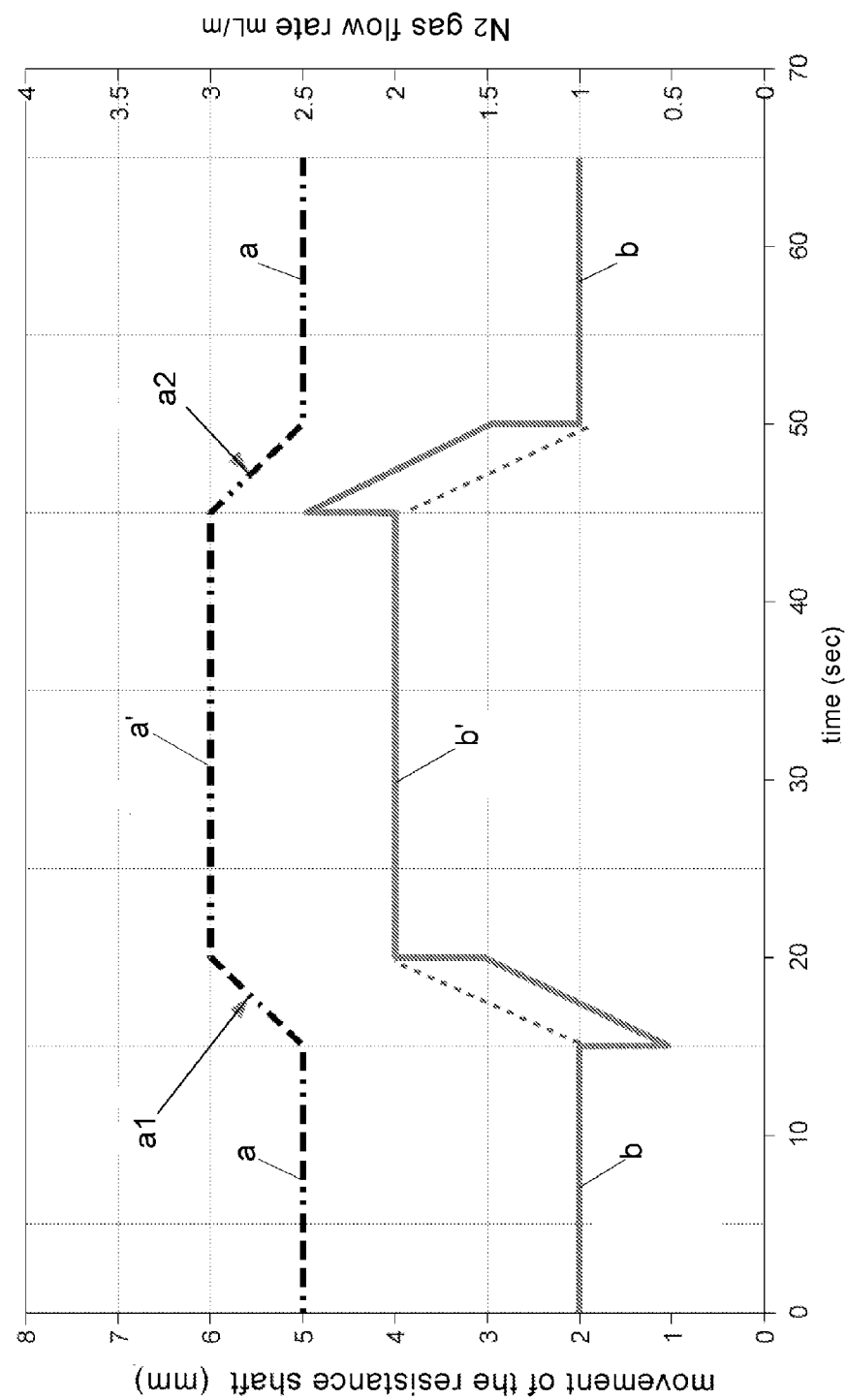
FIG. 5 is a graph indicative of relations between the number of rotations of the operating shaft of a conventional flow rate control valve used with nitrogen gas and an actual flow rate.
Figure 6:
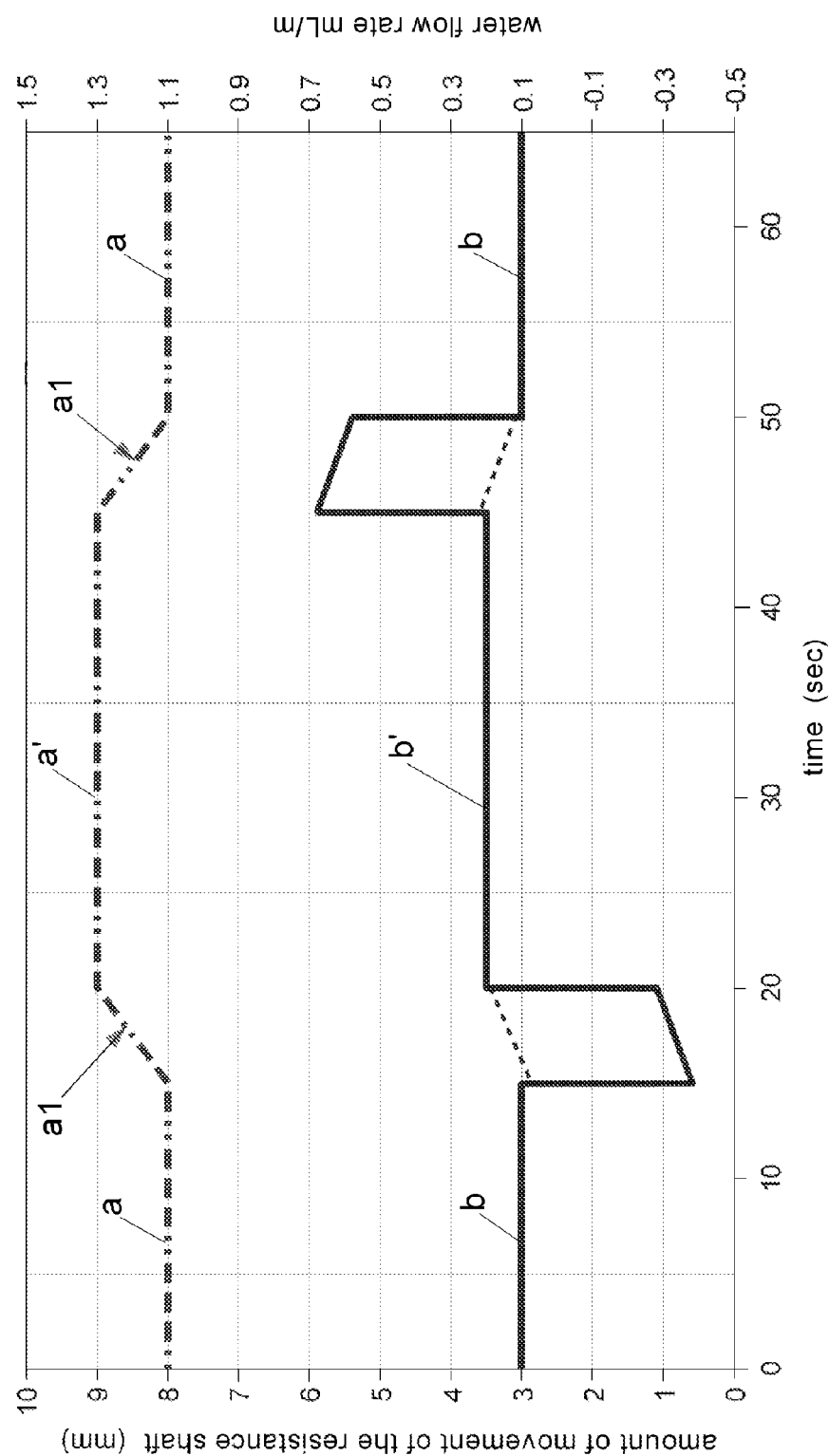
FIG. 6 is a graph indicative of relations between the number of rotations of the operating shaft of a conventional flow rate control valve used with water and an actual flow rate.

The flow rate control valve shown in FIG. 1 was assembled for control of a gas (nitrogen gas) and a liquid (water). As a result, it has been found that there are none of such changes opposite in direction to control as shown in FIGS. 5 and 6, and an actual flow rate, too, changes ideally following flow rate control as shown by broken lines in FIGS. 5 and 6.

Example 2

Figure 3:
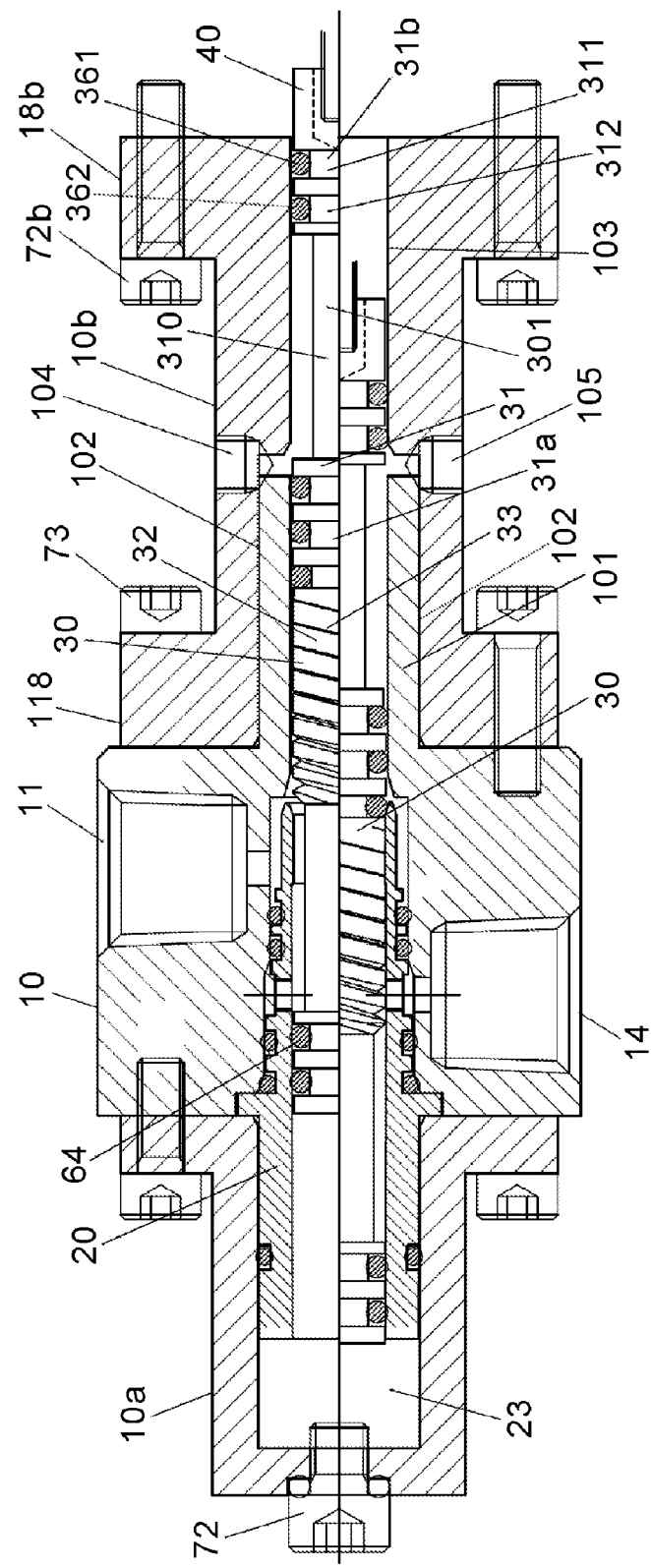
FIG. 3 is a sectional view of another construction and arrangement of the flow rate control valve assembly (Example 3) according to the invention.

FIG. 3 is a sectional view of another example of the invention. In FIG. 3, the same elements as in FIG. 1 are indicated by the same reference numerals: they are not explained anymore. In this example, a guide 310 between the sliding portion 32, O-rings 311, 312, 313 of the sliding shaft 30 and the moving mechanism coupling 40 is extended by the sliding distance of the sliding shaft 30.

Further, the extended guide 130 is provided on the side of the moving mechanism coupling 40 with O-ring grooves 311, 312 in which O-rings 361, 362 are mounted and located so that the side of the moving mechanism coupling 40 is double sealed to reduce a leakage phenomenon of fluid on the moving mechanism side as much as possible. Therefore, even when fluids hazardous to operators and working environments like toxic substances and poisonous substances are handled, they can be used with greater safety than ever before.

To extend the length of the sliding shaft 30, an additional extension body 10b is coupled to the valve body 10 on the side of the moving mechanism coupling 40. The valve body 10 is further provided with a sliding cylindrical portion 101 through which a first sealing portion 31a is slidably. The extension body 10b includes a sliding cavity 103 formed inside, through which a cylindrical cavity 102 capable of including the sliding cylindrical portion 101 inside and the second sealing portion are slidable. A portion of the extension body 10b near the end of the sliding cylindrical portion 101 is provided with an inlet 104 and an outlet 105. As a washing or shielding fluid flows between them, it allows for removal of a fluid leaking in the sliding cavity 103.

The extension body 10b is provided at both ends with a flange 118 and a flange 18b, respectively, and the flange 118 on the valve body side may be coupled to the valve body 10 by means of a setscrew 73. The flange 18b on the side of the moving mechanism coupling 40 may be provided with a moving mechanism or the like by means of a setscrew 72b as is the case with the flange 18 of Example 1.

Thus, the guide 310 is extended to form the first and second sealing portions 31a and 31b for double sealing that contributes to higher sealing effects and greater safety than ever before. If the fluid is likely to leak out or when strict prevention of a fluid leakage is desired, then a washing or shielding fluid is allowed to flow between the inlet 104 and the outlet 105 for removal of a fluid leaking in the sliding cavity 103. It is thus possible to prevent a fluid leakage out of the side of the moving mechanism coupling 40 with ever higher safety than ever before.

The flow rate control valve shown in FIG. 3 was assembled for control of a gas (nitrogen gas) and a liquid (water). As a result, it has been found that there are none of such changes opposite in direction to control as in Example 1, and an actual flow rate, too, changes ideally following flow rate control.

While the moving mechanism is not explained in the aforesaid examples, it is to be understood that use may be made of such moving mechanism as described in Patent Publication 2 and other prior arts or a moving mechanism having a dial gauge, a scale or an indicator. Dial operation may be implemented by a single rotation or multiple rotations or, alternatively, it may be designed in conformity with the necessary precision. A driving mechanism may be used in combination with a precise driver such as a servomotor or a pulse motor for automatic control by a processor or the like. Further, the coupling to the driving mechanism may be provided with bellows and a protective cover to assemble a full closure type valve such as a bellows valve.

APPLICABILITY TO THE INDUSTRY

The flow rate control valve assembly of the invention may be applied to a variety of flow rate control valves provided that they include an operating shaft for piston motion and a flow passage having this piston portion included inside. Exclusion of influences of piston action of the operating shaft ensures that it is possible to gain precise flow rate control in a wide range of very minute flow rates to relatively large flow rates. The valve of the invention can also quickly follow automatic control. For this reason, the valve of the invention may preferably be applied to fields requiring synthesis and blending of various chemicals and precise control of liquids and gases. For instance, the valve of the invention may be applied to a variety of fields inclusive of control of etching and washing fluids used in semiconductor fabrication processes, control of various material flows used in supercritical fluid applied fields, control of washing agents and various processing agents used in precise instrument machining processes, control of raw materials and additives used in thin-film fabrication processes, control of raw materials used for various high-tech materials, and control of various materials in organic synthesis technology.

EXPLANATION OF THE REFERENCE NUMERALS 10, 110: Valve body
20, 120: Sleeve
30, 130: Sliding shaft
21a, 121a: Sliding cylindrical surface
33, 133: Tapered groove
140: Moving mechanism
143: Threaded portion
142: Operating shaft
141: Coupling
41c: Machine screw
10, 110: Valve body
11, 111: Inlet
14, 181: Outlet
65, 165: O-ring
63, 64: Shutoff O-ring

What is claimed is:
1. A flow rate control valve assembly, comprising a sliding shaft and a sliding cylindrical surface which fit slidably in with each other in an axial direction, and a moving mechanism for moving said sliding shaft in an axial direction, wherein:

at least one sliding surface of said sliding shaft and said sliding cylindrical surface is provided with one or a plurality of tapered grooves having its specific area defining a fluid passage, said tapered groove being configured such that flow passage resistance increases or decreases gradually along a lengthwise direction, and a cavity formed at an end of said sliding shaft for making sure of a sliding area is formed at a site isolated or shut off from said fluid passage.

2. A flow rate control valve assembly as recited in claim 1, wherein an inlet or outlet of said fluid passage is formed on a portion of said sliding cylindrical surface.

3. A flow rate control valve assembly as recited in claim 1, wherein said tapered groove is provided at its end with a flow passage extension over a movable range of said sliding shaft, said flow passage extension defining a space area having a flow passage resistance smaller than a minimum flow passage resistance of said tapered groove, and said end is connected to said inlet or said outlet.

4. A flow rate control valve assembly as recited in claim 3, wherein said flow passage extension is defined by a portion of said sliding shaft having a smaller diameter.

5. A flow rate control valve assembly as recited in claim 1, wherein said tapered groove is formed in such a way as to have a flow rate resistance decreasing or increasing gradually according to an exponential function derived from Hagen-Poiseuille equation.

6. A flow rate control valve assembly as recited in claim 1, wherein said tapered groove is formed in such a way as to have a sectional area decreasing or increasing gradually according to a linear characteristic feature wherein the sectional area increases in direct proportion to a moving distance or according to a parabolic characteristic feature wherein the sectional area increases in direct proportion to the square of a moving distance.

7. A flow rate control valve assembly as recited in claim 1, wherein said tapered groove is spirally formed.

8. A flow rate control valve assembly as recited in claim 1, wherein said moving mechanism is constructed of a driving mechanism capable of controllable linear movement.

9. A flow rate control valve assembly as recited in claim 1, wherein said sliding shaft and said moving mechanism are partly covered with bellows.

10. A flow rate control valve assembly as recited in claim 1, wherein a driving shaft of said moving mechanism and said sliding cylindrical surface are constructed of materials having mutually different coefficients of thermal expansion, and said tapered groove is configured such that an amount of change in the flow rate caused by a change in the interval of said fluid passage defined by said tapered groove upon expansion or contraction of said materials due to temperature changes is canceled out by an amount of change in the flow rate caused by a change in viscosity resistance of fluid due to temperature changes or, alternatively, said tapered groove is constructed and arranged such that temperature signals and pressure signals are captured in a computer that controls a driving system to make a correction for deviation from a target figure for the flow rate.

* * * * *